(12) United States Patent
Van Asten

(10) Patent No.: US 7,885,513 B2
(45) Date of Patent: Feb. 8, 2011

(54) SEAMLESS REPRODUCTION FROM A SIGNAL RECORDED ON A FIRST AND A SECOND LAYER OF A RECORD CARRIER

(75) Inventor: Petrus Jacobus Hubertus Johannes Van Asten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1027 days.

(21) Appl. No.: 10/574,883

(22) PCT Filed: Oct. 11, 2004

(86) PCT No.: PCT/IB2004/052046

§ 371 (c)(1),
(2), (4) Date: Apr. 7, 2006

(87) PCT Pub. No.: WO2005/038808

PCT Pub. Date: Apr. 28, 2005

(65) Prior Publication Data

US 2007/0025200 A1    Feb. 1, 2007

(30) Foreign Application Priority Data

Oct. 17, 2003    (EP)    ................... 03103863

(51) Int. Cl.
*H04N 5/85*    (2006.01)
(52) U.S. Cl. ..................................... 386/126
(58) Field of Classification Search ......... 386/124–126, 386/122
See application file for complete search history.

(56) References Cited

U.S. PATENT DOCUMENTS 7,295,762 B2 * 11/2007 Sawabe et al. ................. 386/96
2004/0095812 A1 * 5/2004 Yoshimura et al. .......... 365/200

FOREIGN PATENT DOCUMENTS

JP    2001195198 A    7/2001

OTHER PUBLICATIONS

ISR: PCT/IB04/052046.
Written Opinion: PCT/IB04/052046.
ISR: PCT/IB04/052046, Feb. 11, 2005.
Written Opinion: PCT/IB04/052046, Feb. 11, 2005.

* cited by examiner

*Primary Examiner*—David E Harvey

(57) ABSTRACT

The invention relates to an apparatus for reproducing a digital information signal which is recorded on a first and a second layer of a record carrier, the digital information signal being divided into cells, each cell being recorded in at least one sector, the digital information signal comprising a first cell recorded on the first layer and a second cell recorded on the second layer, while in addition control data indicating that the first and the second cell have to be presented in a non-seamless manner one after the other is recorded on said record carrier. The apparatus is arranged to detect that the first cell is read from the first layer and the second cell is read from the second layer and generates a control signal indicating that the first and the second cell have to be presented seamlessly in dependence on said detection. In this way the control data indicating that the cells have to be presented with a seam is replaced with a control signal indicating that the cells have to presented seamlessly. This results in an improved presentation of the digital information signal at a layer break.

4 Claims, 2 Drawing Sheets

SEAMLESS REPRODUCTION FROM A SIGNAL RECORDED ON A FIRST AND A SECOND LAYER OF A RECORD CARRIER

The present invention relates in general to an apparatus for reproducing a digital information signal which is recorded on a first and a second layer of a record carrier, the digital information signal being divided into cells, each cell being recorded in at least one sector, the digital information signal comprising a first cell recorded on the first layer and a second cell recorded on the second layer, while in addition control data indicating that the first and the second cell have to be represented in a non-seamless manner one after the other is recorded on said record carrier.

More particularly, the present invention relates to an apparatus for reproducing a digital information signal recorded on an optical record carrier such as a DVD dual-layer disc.

The invention further relates to a method of reproducing a digital information signal which is recorded on a first and a second layer of a record carrier, the digital information signal being divided into cells, each cell being recorded in at least one sector, the digital information signal comprising a first cell recorded on the first layer and a second cell recorded on the second layer, while in addition control data indicating that the first and the second cell have to be represented in a non-seamless manner one after the other is recorded on said record carrier.

As is commonly known, an optical storage disc comprises at least one track, either in the form of a continuous spiral or in the form of multiple concentric circles, of storage space where information may be stored in the form of a data pattern. Optical discs are very successful, and several different types have been developed. One such type is DVD (Digital Versatile Disc), and the present invention relates particularly to DVD discs, more particularly to DVD-Video, for which reason the present invention will be explained in the following for DVD-Video discs having two layers. However, the gist of the present invention is also applicable to other types of recordable discs; therefore, the following description is not to be understood as limiting the scope of the present invention to DVD discs only.

Optical discs may be of the read-only type, where information is recorded during manufacturing, which information can only be read by a user. The optical storage disc may also be of a writeable type, where information may be stored by a user. Such discs may be a write-once type, indicated as writable (R), but there are also storage discs where information can be written many times, indicated as rewritable (RW). In the case of DVD, a distinction can be made between two formats, i.e. DVD-RW and DVD+RW.

For reading information from the storage space of the optical storage disc, the track in a layer is scanned by an optical read beam. Since the technology of optical discs in general and the way in which information can be stored in an optical disc are commonly known, it is not necessary here to describe this technology in more detail.

Conventionally, an optical disc has only one storage layer containing a storage track. More recently, optical discs have been developed having two or even more storage layers, each storage layer containing a storage track in the shape of a spiral or multiple concentric circles. In such a case the logical storage space extends over multiple storage layers, hence the range of logical addresses extends contiguously over multiple storage layers. The transition from the last block of one storage layer to the first block of the next storage layer is such that the logical address is incremented only by 1.

A disc made in accordance with the DVD Video Standard may have two layers. If the size of a movie is too large to be stored on one layer, a portion is stored on the first layer and the remaining portion is stored on the second layer.

According to the DVD Video Standard, data is organized in cells, and a transition from one layer to the next is only allowed at a cell boundary. This is related to the fact that, on reading video data from disc, it is desirable to have a seamless continuation of video image display. Furthermore, according to the DVD Video standard, two cells which are presented seamlessly shall be located on the same layer. Therefore, if two cells are to be displayed one after the other on a disc according to the DVD-Video Standard, which cells are recorded on different layers, these cells must be reproduced with a seam. The user will notice this as a visible hiccup in the video. DVD-authors try to mask this hiccup by taking a good point in the movie to have this seam. The seam is preferably on a scene change. However, a user is still able to notice the hiccup.

It is an important objective of the present invention to overcome said disadvantage.

It is an object of the invention to provide an arrangement with an improved reproducing method.

The apparatus in accordance with the invention comprises
  reading means for reading the first cell from the first layer and the second cell from the second layer,
  reading means for reading control data,
  control signal generation means for generating a control signal in dependence on the control data,
  presentation means for presenting the first and the second cell under the control of the control signal, the control signal generating means being adapted to detect that the first cell is read from the first layer and the second cell is read from the second layer and to generate a control signal indicating that the first and the second cell have to be presented seamlessly in dependence on said detection.

The apparatus according to the invention reads the control data from the record carrier. According to said control data, the first cell and the second cell have to be presented one after the other. However, restrictions in the DVD standard imply that, if two cells are located on different layers, these cells must be reproduced with a seam, which is indicated by the non-seamless playback flag in the control data. The apparatus according to the invention determines whether the two cells are from two different layers. If this is the case, the apparatus assumes that the non-seamless reproducing flag is due to the DVD-video standard here and will forward to the presentation means a control signal indicating that the two cells have to be presented in a seamless manner.

In a further embodiment of the invention, the control signal generating means is further adapted to detect that the first cell and the second cell are read from consecutive logical sector numbers and to generate a control signal indicating that the first and the second cell have to be presented seamlessly in dependence on said detection and on the detection that the first cell is read from the first layer and the second cell is read from the second layer. This is an additional test which verifies whether the cells are written contiguously in the logical address space. When two cells have to be presented one after the other and are contiguously stored, this is a clear indication that the non-seamless representation flag is there to satisfy the DVD-Video standard, that there is no reason to have this flag on account the video content, and that the DVD-author did consider this a good location to reproduce the two cells without a seam.

Embodiments of the invention will now be described in more detail, by way of example, with reference to the drawings, in which FIG. 1 is a block diagram schematically illustrating a data storage system;

Figure 1:
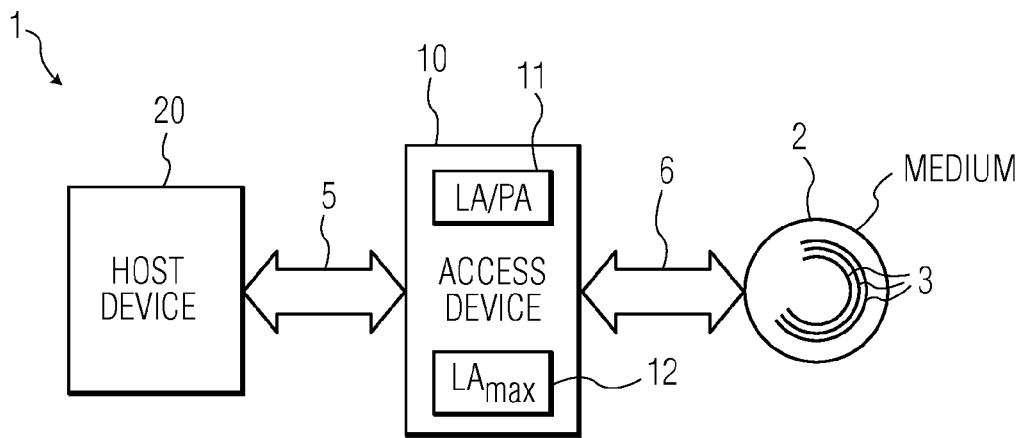

FIG. 1 is a block diagram schematically illustrating a data storage system 1, comprising a data storage medium 2, a medium access device 10, and a host device 20. In a typical practical implementation, the host device 20 may be a suitably programmed personal computer (PC); it is also possible that the data storage system 1 is implemented as a dedicated user apparatus such as a video recorder, in which case the host device 20 is the application part of such an apparatus. In a specific embodiment, the data storage medium 2 is implemented as an optical disc, specifically a DVD, and the medium access device 10 is implemented as a disc drive. In the following, the invention will be described specifically for an optical disc implementation, but it is noted that the present invention is not limited to optical discs.

The optical disc 2 has a storage space 3 which comprises two or more continuous spiral-shaped tracks or track in the form of multiple concentric circles, where information can be stored in the form of a data pattern. Since this technology is commonly known to those skilled in the art, this technology will not be explained in further detail.

Figure 2A:
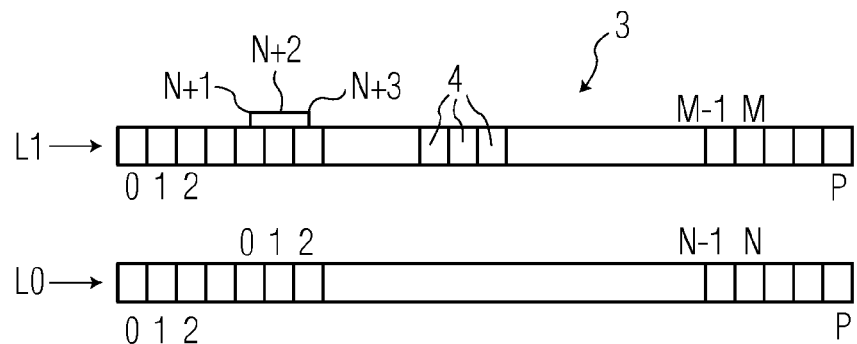
FIG. 2A is a diagram schematically depicting a double-track storage space of storage medium in a PTP arrangement.

The several tracks of the storage space 3 are located in different storage layers of the optical disc 2, which storage layers will be indicated L0, L1, etc. FIG. 2A is a diagram schematically depicting the storage space 3 as a collection of long ribbons, each ribbon corresponding to a storage layer L0, L1, for a case where the optical disc 2 has two storage layers. The storage space 3 is divided into a large number of blocks 4. Each block has a physical address, which will hereinafter be indicated as PA. In FIG. 2A, the physical addresses PA are indicated underneath the blocks 4: in each storage layer L0, L1, the numbering of the physical addresses starts at zero (extreme left block in FIG. 2A). Each subsequent block has an address which is one higher than its predecessor. The last block has the highest address P0, P1. P0=P1 if the two storage layers L0 and L1 are of equal size.

Most blocks also have a logical address, which will hereinafter be indicated as LA; in FIG. 2A, logical addresses are indicated above the blocks 4. Numbering starts at LA=0 for a certain block in L0, which typically is the block with PA=30000 Hex.

The highest logical address in L0 is indicated as N; this is not necessarily the last block of L0.

The lowest logical address in the next storage layer L1 is LA=N+1, for a certain block in L1, which is not necessarily the first block; typically, this is the block with PA=30000 Hex in L1, i.e. the same physical address as the first logical address LA=0 in the first storage layer L0, but this is not essential.

The highest logical address is indicated as N; this does not necessarily correspond to the last block of L1.

Figure 2B:
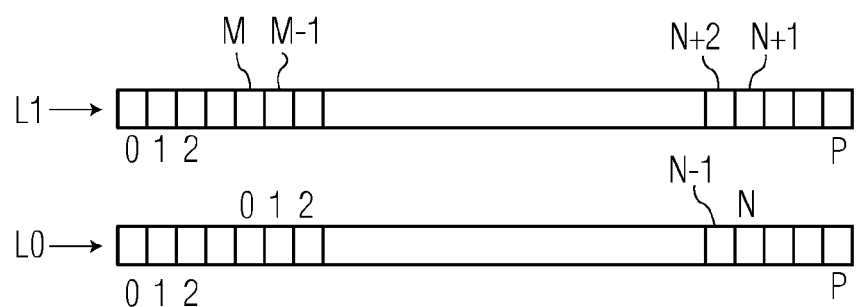
FIG. 2B is a diagram schematically depicting a double-track storage space of storage medium in an OTP arrangement.

In the first logical layer L0, when comparing two blocks, the one with the highest logical address also has the highest physical address. In FIG. 2A, the same applies to the second storage layer L1; such a configuration is indicated as Parallel Track Path (PTP). FIG. 2B is a diagram comparable to FIG. 2A, for a case of an Opposite Track Path (OTP) configuration, in which case increasing logical addresses correspond to decreasing physical addresses. The radial location of block LA=N in L0 now corresponds to the radial location of block LA=N+1 in L1, as the Figure shows.

Figure 2C:
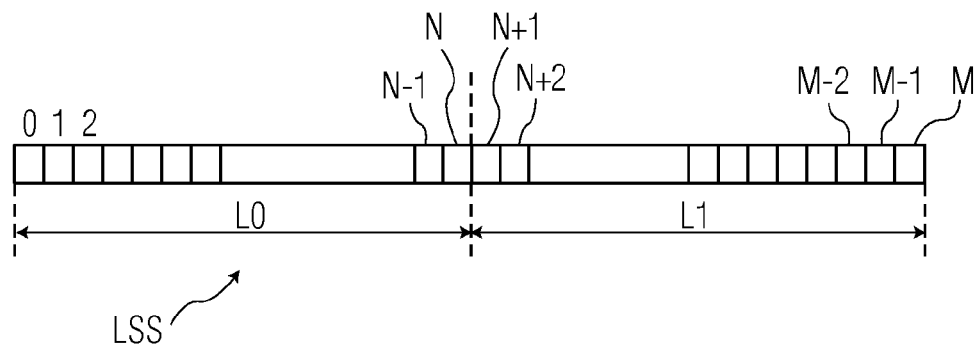
FIG. 2C is a diagram schematically depicting a logical storage space.

The blocks having logical addresses together define the logical storage space (LSS). FIG. 2C is a diagram schematically depicting the LSS as one long continuous ribbon. In the LSS, the addresses range from zero to M. When the host device 20 wants to access a certain piece of information, it sends a request to the disc drive 10 indicating the corresponding logical address. The disc drive 10 comprises a memory 11 which contains information regarding the relationship between logical addresses LA and physical addresses PA, for instance in the form of a look-up table. Based on this information, the disc drive 10 determines which storage layer and which physical address correspond to the required logical address.

Blocks with PA<30000 Hex are used for the lead-in area on a DVD. The lead-in area is used to store disc-specific information, such as the number of layers, the size of L0, and the last physical address PA, which corresponds to the location of the block with logical address M. It should be noted the size of L0 may be expressed as the number of logical blocks on L0 or the last physical address PA which corresponds to the location of the highest logical address in L0. The disc drive 10 is able to read the information stored in the lead-in area Furthermore, the physical address where the logical storage space begins is specified in the lead-in area; this is the logical block with LA=0. The physical address is 30000 Hex on a DVD disc.

Figure 3:
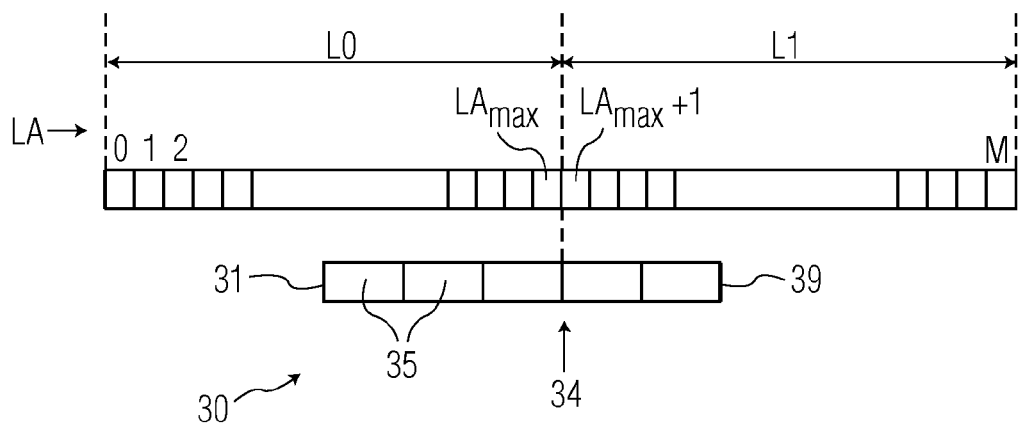
FIG. 3 is a diagram schematically depicting a logical storage space as well as a video sequence; and, FIG. 4 is a block diagram schematically illustrating a reproducing apparatus according to the invention.

FIG. 3 is a diagram comparable to FIG. 2C, showing the LSS, and also schematically showing a video sequence 30, for instance corresponding to a movie, also illustrated as a ribbon, which extends from a location in L0 to a location in L1. The video sequence 30 has a start 31 and an end 39. The data of the video sequence 30 define video cells 35; cell boundaries between the video cells 35 are indicated at 34. With respect to "video cells", reference is made to part III of the DVD video specification. A video cell comprises a part of the video stream with a presentation time in a range of 0.4-1.0 second and is a multiplex of the video, audio, and graphic signals. According to the DVD-video specification, a cell must be located on one and the same layer. Furthermore, two cells which are presented seamlessly must be allocated on the same layer. Therefore, the cell boundary 34 corresponds to the layer jump position from L0 to L1. Furthermore, the first block of the cell on L1 has a logical address N+1 and the last block of the preceding cell in the video sequence has a logical address N.

In FIG. 1, a host/drive communication link between host device 20 and disc drive 10 is indicated at 5. Likewise, a drive/disc communication link between disc drive 10 and disc 2 is indicated at 6. The drive/disc communication link 6 represents the physical (optical) read/write operation as well as the physical addressing of blocks 4 of the storage space 3. The host/drive communication link 5 represents a data transfer path as well as a command transfer path.

Figure 4:
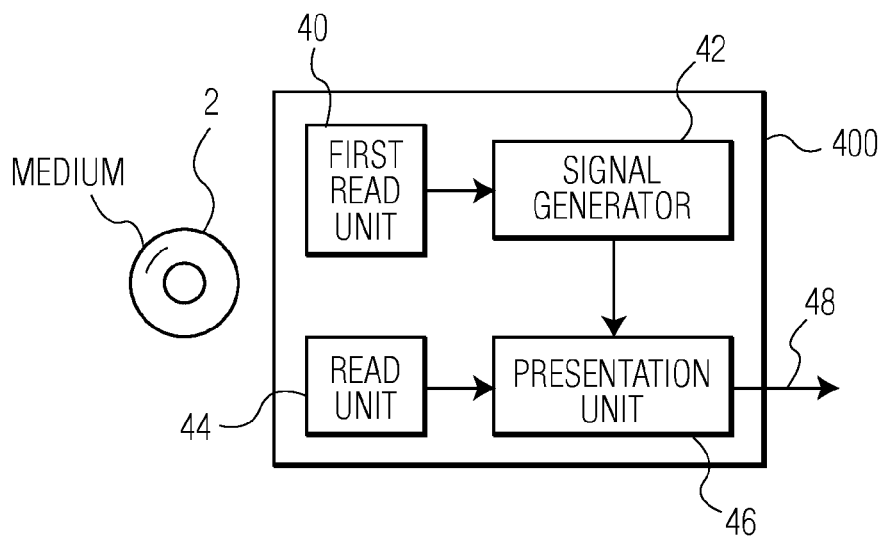

FIG. 4 is a block diagram illustrating a reproducing apparatus 400 according to the invention. The apparatus comprises a first reading unit 40 for reading control data from the record carrier 2. These control data defines conditions from which the reproducing apparatus determines how to play back a digital information signal recorded on the record carrier 2.

The control data read is supplied to a control signal generator unit 42. The control data enables a presentation unit 46 to determine the first logical address of a cell and the last logical address of a cell in the logical storage space, this information being used to instruct a reading unit 44 to read the logical blocks corresponding to said cell from the logical storage space. Those skilled in the art know how to calculate these logical addresses from the control data on a DVD. Furthermore, it is defined for each cell by means of a Seamless playback flag whether said cell should be presented seamlessly or not after presentation of the previous cell. In a prior-art DVD player this flag is passed on to a presentation unit 46. The apparatus further comprises a second reading unit 44 for reading the digital information signal from the record carrier 2. The digital information signal is a multiplexed stream comprising the video, audio, and graphic signals. The digital information signal is sub-divided into a sequence of cells which are stored in blocks on the record carrier. The digital information signal read from the record carrier is supplied to an input of the presentation unit 46. The presentation unit 46 is arranged to decode the video, audio, and graphics signals in the digital information signal and to combine the respective signals so as to obtain an output signal 48 to be supplied to a display device, such as a TV, LCD, or beamer. The control data read by reading unit 40 is supplied to the control signal generator unit 42, which determines in dependence on the control data the way the content of the digital information signal should be decoded and presented by the presentation unit 46. The first and the second reading unit of FIG. 4 are normally part of the disc drive 10 of FIG. 1. The control signal generator unit 42 and the presentation unit 46 in FIG. 4 are normally part of the host device 20 in FIG. 1. However, depending on the implementation, some functions may be performed in the host device or the disc drive.

The first reading unit 40 is further arranged to read information from the lead-in area of an optical disc. In dependence on this information the reproducing apparatus 400 is able to determine on which layer a cell is stored. The size of the first layer may be defined by the parameter $L0_{size}$. If $L0_{size}$ is defined to be the logical address of the last block on the first layer L0, i.e. N in FIG. 2, a cell will be located on the first layer if the logical address of the first block of said cell is in the range [0 ... N] and a cell will be located on the second layer if the logical address of the first block of said cell is in the range [N+1 ... M], where M is sequence number of the last block in the logical storage space LSS. If $L0_{size}$ is defined to be the physical address of the last block used by the logical storage space on the first layer, then the apparatus further needs to know the physical address of the first block used by the logical storage space on the first layer L0. The difference between the number of the last physical address used by the logical storage space and the number of the first physical address used by the storage space defines the range of the logical addresses on the first layer. On a DVD, the first physical address used by the logical storage space is 30000 Hex.

The control signal generator unit 42 detects in dependence on the start address of the logical addresses used by a first cell of two consecutive cells and the logical addresses used by a second cell of said two consecutive cells and the parameter $L0_{size}$ whether the first cell is read from the first layer and the second cell is read from the second layer. If this is the case, the seamless playback flag in the control data read from the record carrier indicates that the two cells should be presented with a seam in the DVD-standard. As said flag is normally set on account of the standard and not because said cells should not be presented seamlessly, the control signal in the apparatus according to the invention generates upon said detection a control signal that indicates that the first and the second cell have to be presented seamlessly. The presentation unit 46 accordingly presents the first and second cell seamlessly under the control of said control signal.

In a further embodiment of the reproducing apparatus, the control signal generating unit 42 is further adapted to detect that the first cell and the second cell are read from consecutive logical sector numbers and generates a control signal indicating that the first and the second cell have to be presented seamlessly in dependence on said detection and on the detection that the first cell is read from the first layer and the second cell is read from the second layer. The detection on which layer the first and the second cell are stored is as described above. The control signal generator unit 42 detects whether the first and the second cell are read from blocks having consecutive logical sector numbers by retrieving from the control a first parameter C_LVOBU_EA indicating the address of the last logical block of the first cell and a second parameter C_FVOBU_SA indicating the address of the first logical block of the second cell and determining whether the first parameter and the second parameter have consecutive address values.

Though the invention is described with reference to preferred embodiments thereof, it is to be understood that these are non-limitative examples. Thus, various modifications are conceivable to those skilled in the art, without departing from the scope of the invention, as defined by the claims. For example, in case of a disc with the multi-angle feature, a scene may be prosecuted in several versions. All these scenes could be meant to be seamlessly reproduced, however, due to the layer dump, each of the cells representing a version to be represented after a first cell may be stored on the other layer as compared with the first cell. Therefore, two cells that have to be presented seamlessly do not necessarily to be stored in consecutive blocks.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

I claim:

1. Apparatus for reproducing a digital information signal which is recorded on a first and a second layer of a record carrier, the digital information signal being divided into cells, each cell being recorded in at least one sector, the digital information signal comprising a first cell recorded on the first layer and a second cell recorded on the second layer, the apparatus comprising:
reading means for reading the first cell from the first layer and the second cell from the second layer,
control signal generation means for generating a control signal,
presentation means for presenting the first cell and second cell under control of the control signal, characterized in that:
the layers of said record carrier comprising sectors wherein each sector has a unique logical sector number, and the sectors being numbered in consecutive ascending order, the first cell being recorded in consecutive sectors and the second cell being recorded in consecutive numbered sectors subsequent to the sectors of the first cell and the control signal generating means being adapted to:

detect that the first cell is read from the first layer and the second cell is read from the second layer and the logical sector number of the first cell and the second cell are sequential and generate the control signal indicating that the first and the second cell have to be presented seamlessly in dependence on said detection of consecutive sectors between the first and second layer.

2. Apparatus as claimed in claim 1, characterized in that the apparatus is arranged for reproducing a digital information signal which is recorded on the first and the second layer of the record carrier in accordance with a DVD-standard.

3. Method of reproducing a digital information signal which is recorded on a first and a second layer of a record carrier, the digital information signal being divided into cells, each cell being recorded in at least one sector, the digital information signal comprising a first cell recorded on the first layer and a second cell recorded on the second layer, while in addition a control data indicating that the first cell and the second cell are represented in a non-seamless manner one after the other is recorded on said record carrier, the method comprising the steps of:

reading the first cell from the first layer and the second cell from the second layer, wherein the layers of said record carrier comprising sectors wherein each sector has a unique logical sector number, and the sectors being numbered in consecutive ascending order, the first cell being recorded in consecutive sectors and the second cell being recorded in consecutive sectors numbered subsequent to the sectors of the first cell detecting that the first cell is read from the first layer and the second cell is read from the second layer and the logical sector number of the first cell and the second cell are sequential to generate a first detection signal, generating a control signal indicating that the first and the second cell have to be presented seamlessly in dependence on said first detection signal, and presenting the first cell and the second cell under the control of the control signal.

4. Method as claimed in claim 3, characterized in that the method is arranged for reproducing a digital information signal which is recorded on the first and the second layer of the record carrier in accordance with a DVD-standard.

* * * * *